(12) United States Patent
Shanmugasundaram et al.

(10) Patent No.: US 9,208,381 B1
(45) Date of Patent: Dec. 8, 2015

(54) PROCESSING DIGITAL IMAGES INCLUDING CHARACTER RECOGNITION USING ONTOLOGICAL RULES

(71) Applicants: Satishkumar Kothandapani Shanmugasundaram, Chennai (IN); Niranjan Jayakar, Chennai (IN)

(72) Inventors: Satishkumar Kothandapani Shanmugasundaram, Chennai (IN); Niranjan Jayakar, Chennai (IN)

(73) Assignee: Amazon Technologies, Inc., Reno, NV (US)

( * ) Notice: Subject to any disclaimer, the term of this patent is extended or adjusted under 35 U.S.C. 154(b) by 18 days.

(21) Appl. No.: 13/714,326

(22) Filed: Dec. 13, 2012

(51) Int. Cl.
  *G06K 9/72* (2006.01)
  *G06K 9/00* (2006.01)

(52) U.S. Cl.
  CPC .................. *G06K 9/00496* (2013.01)

(58) Field of Classification Search
  None
  See application file for complete search history.

(56) References Cited

U.S. PATENT DOCUMENTS

| | | | |
|---|---|---|---|
| 6,219,453 B1 * | 4/2001 | Goldberg | 382/229 |
| 6,956,968 B1 * | 10/2005 | O'Dell et al. | 382/182 |
| 2005/0135678 A1 * | 6/2005 | Wecker et al. | 382/186 |
| 2006/0045341 A1 * | 3/2006 | Yi | 382/182 |
| 2009/0324076 A1 * | 12/2009 | Kolmykov-Zotov et al. | 382/170 |
| 2010/0171999 A1 * | 7/2010 | Namikata et al. | 358/530 |

* cited by examiner

*Primary Examiner* — Sumati Lefkowitz
*Assistant Examiner* — David Perlman
(74) *Attorney, Agent, or Firm* — Schwabe Williamson & Wyatt PC

(57) ABSTRACT

Embodiments of methods, systems, and storage medium associated with processing of digital images including character recognition are disclosed herein. In one instance, the method may include identifying at least some components of a plurality of characters included in a digital image of content, based at least in part on comparison of a vector representation of each component with predefined component shape patterns; and determining one or more characters from the identified components. The determining may be based at least in part on evaluating the identified components using predetermined combination rules that define the one or more characters based at least in part on relationships between the one or more components in the identified plurality of characters. Other embodiments may be described and/or claimed.

25 Claims, 6 Drawing Sheets

Combination Pattern Rules (Punctuation)

1. PUNCTUATION_PATTERN.put("PT1_PTh", '\u003B'); // ;
2. PUNCTUATION_PATTERN.put("PT2_PT1", '\uFF1F'); // ?
3. PUNCTUATION_PATTERN.put("PTh_PTh", '\u201D'); // "
4. PUNCTUATION_PATTERN.put("PT3_PT1", '\u0021'); // !
5. PUNCTUATION_PATTERN.put("PTL_PTL", '\u201C'); // "
6. PUNCTUATION_PATTERN.put("PT5_PT5", '\u301D'); // "
7. PUNCTUATION_PATTERN.put("PT5_PT5", '\u301F'); // „
8. PUNCTUATION_PATTERN.put("PT1_PT1_PT1", '\u20DB'); // "
9. PUNCTUATION_PATTERN.put("PT3_PT3_PT1_PT1", '\u203C'); // !!
10. PUNCTUATION_PATTERN.put("PT3_PT2_PT1_PT1", '\u2049'); // !?
11. PUNCTUATION_PATTERN.put("PT2_PT2_PT1_PT1", '\u2047'); // ??
12. PUNCTUATION_PATTERN.put("PT2_PT3_PT1_PT1", '\u2048'); // ?!
13. PUNCTUATION_PATTERN.put("PTh", '\uFF0C'); // ,
14. PUNCTUATION_PATTERN.put("PT7", '\u300C'); // 「
15. PUNCTUATION_PATTERN.put("PT8", '\u300D'); // 」
16. PUNCTUATION_PATTERN.put("PT01", '\u3002'); // 。
17. PUNCTUATION_PATTERN.put("PT1_PT1", '\u003A'); // :
18. PUNCTUATION_PATTERN.put("PT1", '\u002E'); // .

*Fig. 5*

PROCESSING DIGITAL IMAGES INCLUDING CHARACTER RECOGNITION USING ONTOLOGICAL RULES

BACKGROUND

As the use of computers and computer-based networks continues to expand, content providers are preparing and distributing more and more content in electronic form. This content includes traditional media such as books, magazines, newspapers, newsletters, manuals, guides, references, articles, reports, documents, etc., that exist in print and may be transformed from print into digital form through the use of a scanning device or other available means. A page image rendered to a user in a digital form allows the user to see the page of content as it would appear in print.

However, content providers may face challenges when generating the images of content, particularly when the accuracy of recognizing text in images is important. For example, to enable users to read page images from a book or magazine on a computer screen, or to print them for later reading, the images must be sufficiently clear to present legible and correctly translated text. Currently, the images of content may be translated into computer-readable data using various character recognition techniques, such as, for example, optical character recognition (OCR). Although the accuracy of OCR may be generally high, some characters, for example ones belonging to East Asian languages, may be identified incorrectly and/or interpreted wrongly. The cost of manually correcting misidentified characters may be extremely high, especially when scanning a large volume of pages.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 5 illustrates an example set of combination rules that may be used for identification of various characters based on identified character components in accordance with various embodiments.

DETAILED DESCRIPTION

Figure 1:
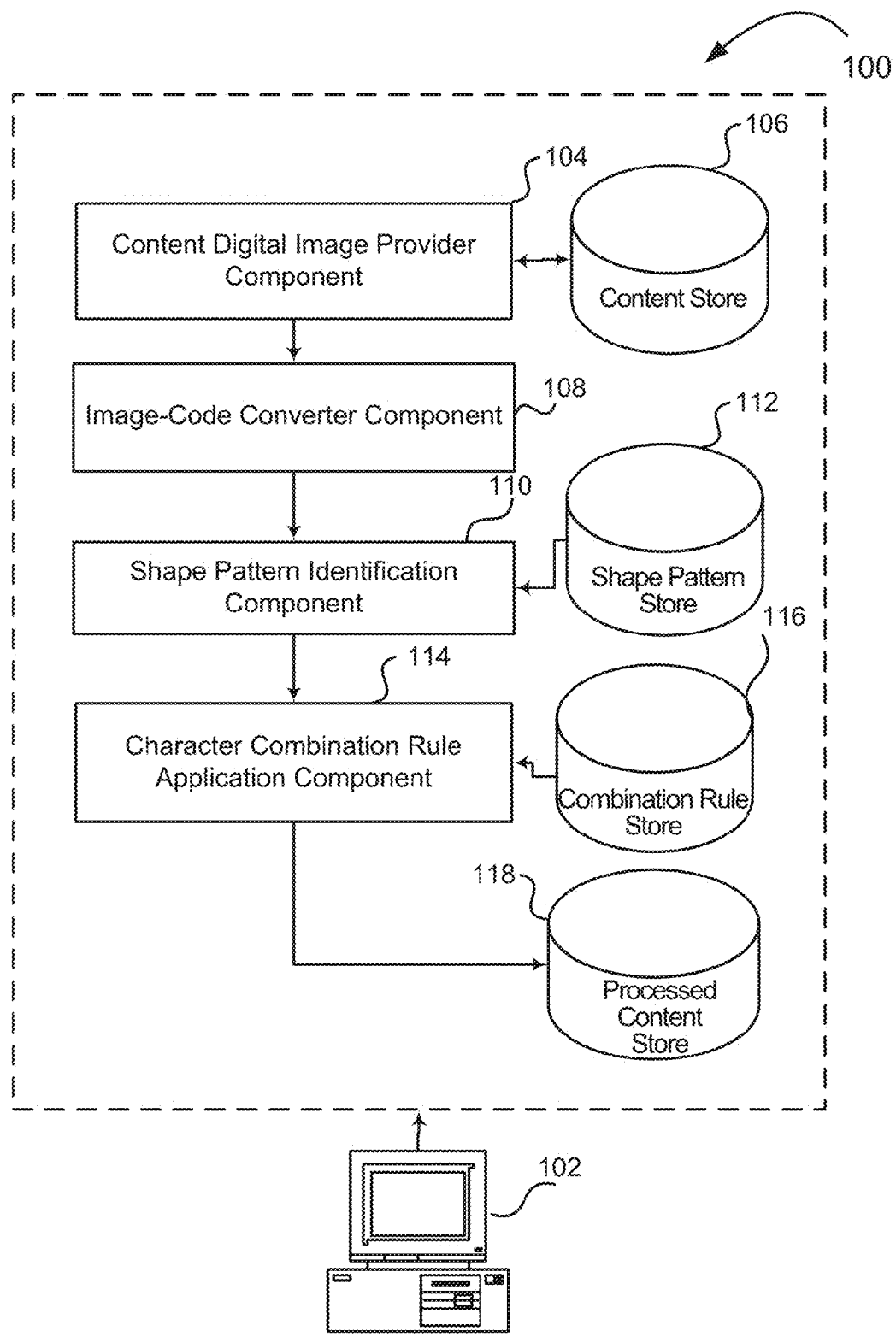
FIG. 1 is a block diagram illustrating logical components of an image processing system for processing a digital image including character recognition using combination rules in accordance with various embodiments.

Techniques described herein provide for processing digital images including character recognition using combination rules. Optionally, neural networks are also employed for digital image processing. Content, such as text including characters, may be scanned or otherwise processed to provide a digital image of the content. A character may include any symbol, sign, numeral or letter and may be comprised of one or more components. The digital image of the content may be converted in a code form using conversion techniques for converting raster graphics, for example, vectorization. A code form (e.g., vector representation) of a character in the content may include vector representations of each component, including parameters defining spatial positions of each component (e.g., relative to other components in the character). The vectorized version of the digital image of the content may be applied (inputted) to an artificial neural network that has been trained to recognize character component shapes based on predefined shape patterns. For example, a neural network may be trained to recognize particular character components, such as components comprising punctuation marks. Accordingly, the neural network may evaluate the vectorized version of the content in order to recognize character components included in the vectorized version.

As a result of the application of the code form of the digital image to the neural network, the character components may be identified based on comparison of the coded forms of components to the predefined shape patterns. From the identified character components, the characters may then be inferred, e.g., "reconstructed" by applying component combination rules to the identified character components. The combination rules may be predetermined based on, for example, known spatial positions of components relative to each other that may comprise a particular character. The reconstructed (determined) characters may be outputted in a known character code form corresponding to the determined character, for example, Unicode®.

For example, a scanned digital image (e.g., in a raster image form) of a question mark "?" may be included in the text. The digital image may be converted into a vectorized form, with the upper and lower components of "?" vectorized as two separate character components. One component may correspond to a curve of the question mark and another component may correspond to a dot of the question mark. The two character components in a vectorized form may be inputted to a neural network. The neural network may have been trained to evaluate the vectorized form to recognize the shapes of dots and curves corresponding to the question mark, using, for example, a predetermined shape pattern set. If a match between the vectorized form of each component (curve and dot) and corresponding shape patterns associated with the neural network is found (e.g., the match may be found to be within a predetermined margin), the two components may be identified as a curve and a dot.

Then, using predefined combination rules, the question mark may be inferred, or reconstructed, from the two identified character components. The combination rules for a question mark may specify, for example, that a curve is supposed to be above the dot, that the curve must be at least 50% of the size of the character, that the dot must be separated from the curve by a predetermined distance, and the like. If at least some of the combination rules are satisfied (with a predetermined margin of error), an inference may be made that a combination (e.g., a sequence) of a curve and a dot is indeed a question mark. The resulting character may be outputted in a character code form. For example, the Unicode® equivalent for the identified question mark is U+FF1F. Accordingly, the result of the inference may be outputted in a Unicode equivalent.

FIG. 1 is a block diagram illustrating logical components of a digital image processing system 100 suitable for processing digital images of content, including character recognition using combination rules, in accordance with some embodiments. Optionally, neural networks may also be employed for digital image processing. The system 100 may include one or more computing devices 102 configured to perform the digital image processing operations as described below in reference to the logical components of the system 100.

The content may include any type of written or printed content, such as text, images, or a combination of text and images such as books, magazines, newspapers, newsletters, manuals, guides, references, articles, reports, documents, and the like. The content may include different characters, e.g., letters, signs, hieroglyphs, marks, icons, and the like. In one example, the content may be written or printed in foreign languages, such as East Asian languages. The foreign languages may include, for example, Chinese, Japanese, Korean, and Vietnamese, known collectively as CKJV.

The system 100 may include a content digital image provider component 104 configured to process content described above, to generate a digital image of the content. For example, the content digital image provider component 104 may be configured to enable scanning of the content or applying OCR to the content. The content may be stored, for example, by a content store 106. The digital image resulting from the content processing by the content digital image provider component 104 may take different forms that may include, but may not be limited to, a raster image form. For example, the digital image may include raster images of characters comprising the content. As discussed above, a question mark may be rendered as a raster image of a character component corresponding to a curve and another raster image of a character component corresponding to a dot.

The system 100 may further include an image-code converter component 108 configured to convert the content digital image into a code form, in one example, in a vector representation. For example, the character components of the characters comprising the digital image of content may be converted into Bezier curves. Each curve that is not disjointed may be identified as a single component of a character (e.g., a curve and a dot in a question mark). A character component may include any component shape that is not disjointed. For example, a curve of the question mark is not disjointed and therefore may be considered as a character component.

The code form (e.g., vector representation) of a component may include, as a part of a definition of a shape of the component (e.g., Bezier curve), one or more characteristics associated with the components. For example, the vectorized version may include a spatial position of a component. The spatial position may include, for example, a character boundary within which the component is placed in the character or in a page of text, a location of the component within the boundary, and the like. The vectorized version may further include various attributes related to character components that may be derived from the spatial position of a component. For example, the attributes may include a position of the character component relative to other character components, a position of the character components in the digital image of the text or portion of the text (e.g., paragraph), a location of the component within the character or component boundary, and the like.

Figure 4:
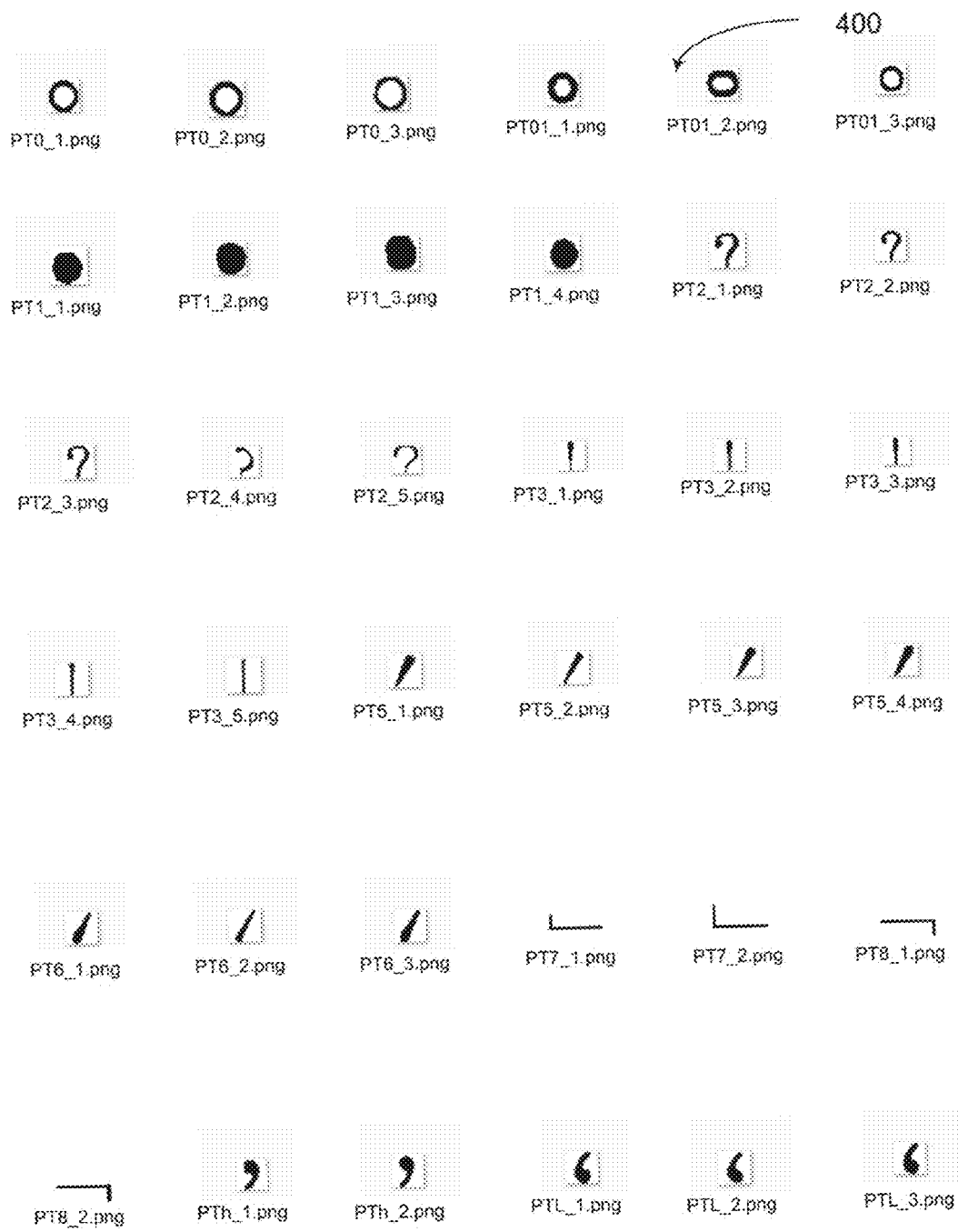
FIG. 4 illustrates an example training set of different shape patterns that may be used for training a neural network in accordance with various embodiments.

The system 100 may further include a shape pattern identification component 110 configured to identify predefined shape patterns corresponding to particular character components. The shape pattern sets required for shape pattern identification may be stored in a shape pattern store 112. An example of shape pattern training set 400 is illustrated in FIG. 4 and is described below in greater detail. In some embodiments, the shape pattern identification component 110 may be implemented as an artificial neural network. For example, the character components may be identified by matching the code forms (e.g., vector representations) of character components to the shape patterns in the training set 400 and obtaining pattern match scores for each match. If a pattern match score equals or above a predetermined pattern identification threshold (e.g., 75%), a shape of the character component may be identified based on the match.

The system 100 may further include a character combination rule application component 114 configured to determine the characters based on the identified character components. The identification may be performed, for example, using predetermined character combination rules that may be retrieved from a combination rule store 116. In one example, the combination rules may be combined in a combination rules engine. The combination rules may be based upon certain characteristics associated with a character. For example, the combination rules may be based on the spatial positions of components included in the character that may be obtained from a vectorized version of the component.

The combination rules may be applied to the identified character components. For example, a set of components may be checked against a combination rule to determine whether a particular sequence of components may comprise a character defined by the combination rule. For example, a combination rule may specify that a component sequence including a curve followed by a dot and having a particular spatial relationship relative to each other (e.g., the dot may be underneath the curve and/or at a certain distance from the lowest point of the curve) defines a question mark.

Based on the combination rules, the characters may be inferred, e.g., reconstructed from the identified components and provided (e.g., outputted) in a character code form, for example. The character code form may include Unicode® representation of a character as described below in reference to FIG. 5. The outputted character codes may be stored in a processed content store 118.

Figure 2:
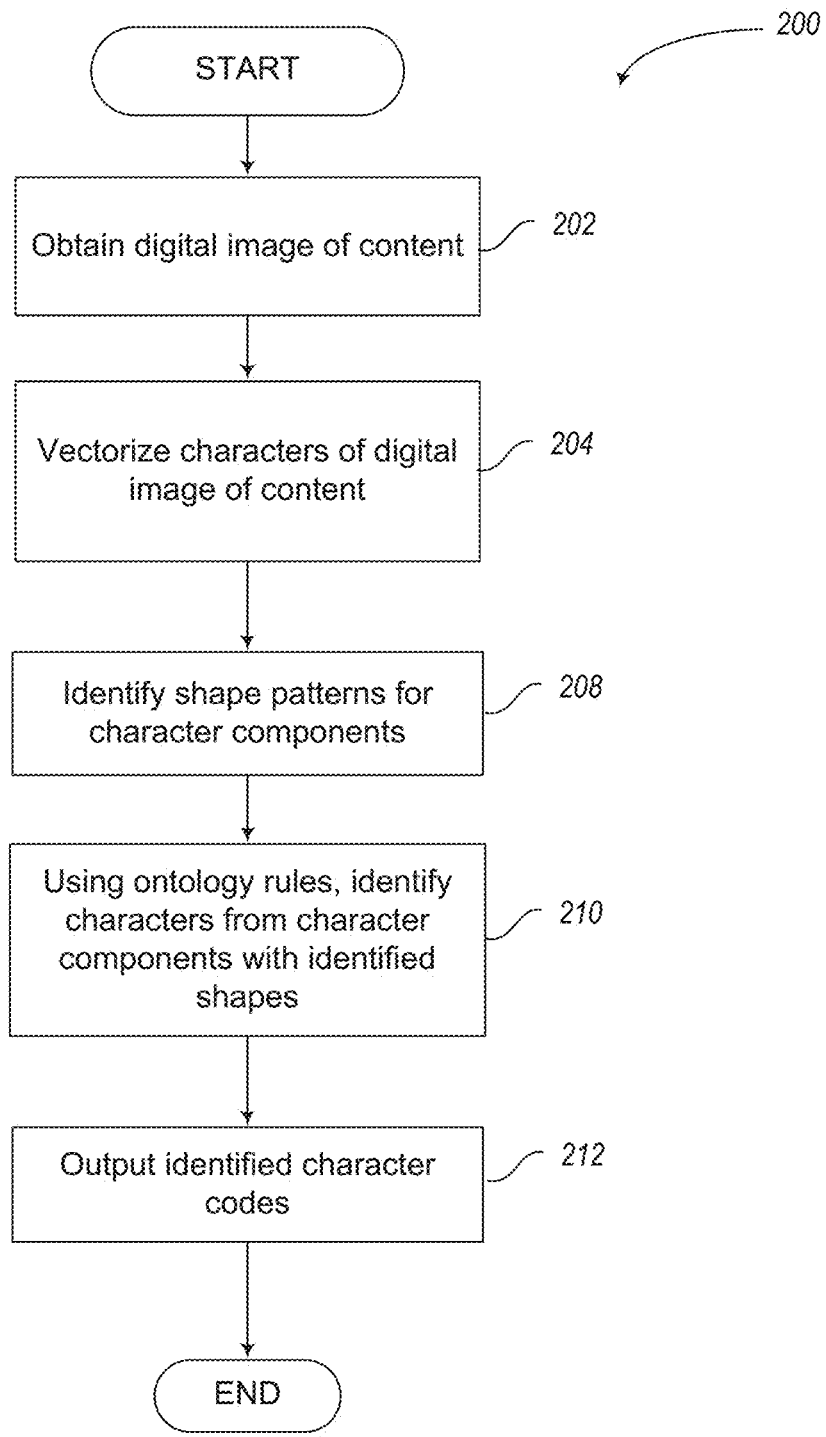
FIG. 2 illustrates a process flow diagram for processing a digital image including character recognition using combination rules in accordance with various embodiments.

FIG. 2 is a process flow diagram illustrating a process 200 for processing digital images of content using a neural network and combination rules as earlier described with reference to FIG. 1, in accordance with various embodiments.

Figure 3:
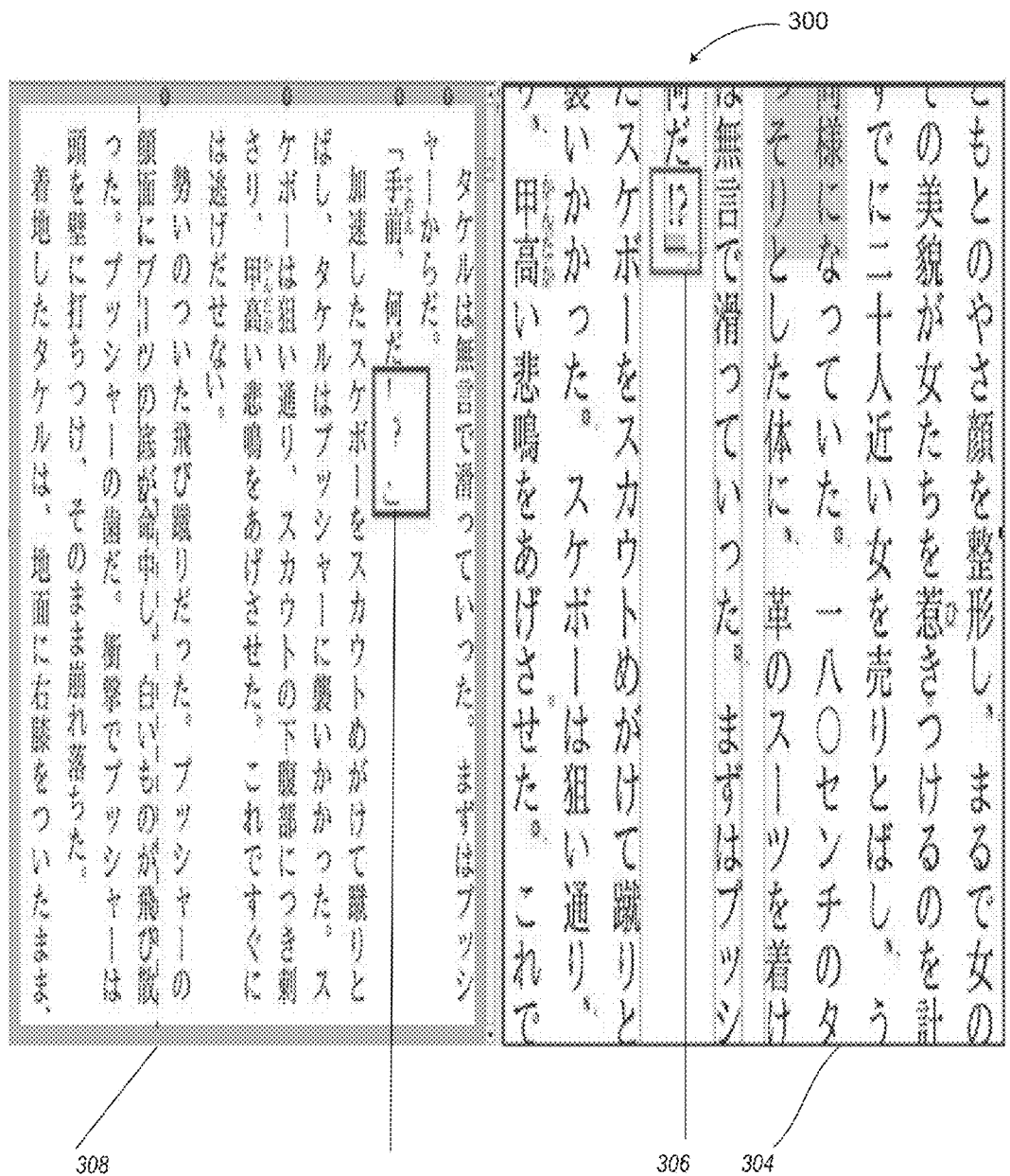
FIG. 3 illustrates example screenshots of a physical page containing Japanese characters including a character and its representation as a combination of character components in accordance with various embodiments.

The process 200 may begin at block 202, where the content digital image provider component 104 may obtain a digital image of content, e.g., from scanning the content, such as text and/or images as described in reference to FIG. 1. In another example, the digital image may be obtained as a result of OCR. FIG. 3 illustrates example screenshots 304 and 308, wherein the example screenshot 304 illustrates a representation of a physical page containing Japanese characters. The character shown in box 306 represents a valid Japanese character that includes an exclamation point, two dashes, and a question mark. The screenshot 308 illustrates a result of OCR of the page of characters illustrated in 304. As shown, the character of the box 306 may be interpreted as separate characters, shown in box 310.

At block 204, the image-code converter component 108 may convert, e.g., vectorize, the character components of the digital image of content. For example, the image-code converter component 108 may convert each component of a character separately, as a sequence of character components, similar to ones illustrated in box 310 of FIG. 3. In another example discussed above, a question mark "?" included in the text may be converted as two separate character components, one component corresponding to a curve of the question mark, and another component corresponding to a dot in the question mark. Likewise, all characters in the text (e.g., illustrated in the page on the screenshot 304) may be converted in a sequence of character components. Each character component, besides a formula describing a shape of a character component, may include spatial position parameters as described above in reference to FIG. 1.

At block 208, the shape pattern identification component 110 may identify the shape patterns for vectorized character components. As discussed in reference to FIG. 1, the shape patterns for character components may be identified using a neural network configured (trained) to recognize some or all shapes of some or all vectorized characters in the content. The identification may be based on matching the vectorized components to a shape pattern training set associated with the neural network.

An example training set 400 is illustrated in FIG. 4. Shapes identified by identifiers PT0 and PT1 may represent different shape patterns for identification of a dot, shapes identified by identifiers PT2 may represent different shape patterns for identification of a curve of a question mark, shapes identified by identifiers PT3 may represent different shape patterns for identification of a vertical component of an exclamation point, and so on. Assume a match is found between a vectorized version of a particular character component and, for example, one of the shapes PT0 or PT1 with a pattern identification threshold exceeding a predetermined value (e.g., 75%). Accordingly, an inference may be made that the particular component is a dot. Assume that a match is found between another character component and one of the shapes PT2 with the pattern identification threshold exceeding a predetermined value (e.g., 80%). Then, an inference may be made that the character component is a question mark curve.

At block 210, the character combination rule application component 114 may identify characters from character components identified at block 208. As discussed above, the identification may be performed, for example, using predetermined character combination rules that may be provided by a combination rules engine.

The combination rules may be created and combined in the combination rules engine, which may include an application configured to infer logical consequences (e.g., characters) from a set of asserted rules (e.g., combination rules) based on input information (e.g., identified character components). The combination rules may be created empirically or in a computerized fashion. The rules may be defined based on known characteristics associated with different characters. For example, a curve in a question mark may be at least 50% of the size of a character; the bottom 5% of the curve may be in alignment with the center of a net curve; the center of a current curve may be in alignment with a bottom half of the previous curve, and the like. Based on the known characteristics of the character, a rule combining character components into a character may be created.

More generally, the combination rules may include a variety of different pattern identification rules that may apply to inferring a character from identified character component shapes. For example, combination rules may be created that may apply to characters having one component, for example, letter "o". The rules applied to a character having one component may define, for example, a shape of the component comprising a character, its position within the character boundary, and the like. Combination rules may further include combination rules that may be based at least in part on relative positions of character components within the character, component alignments, and the like. Combination rules may further be based on positions of characters relative to each other, on positions of characters on a page of text, in a paragraph of text, in a sentence, and/or portions of text. In one example, a combination rule may be based on a positional check of one or more identified character components within a portion of text.

An example set 500 of such combination rules is illustrated in FIG. 5. While the illustrated rules apply to punctuation, it should be understood that combination rules may be developed for any type of character in any language. For example, Rule 2 of the example set 500 provides that a combination of recognized patterns PT2 and PT1 returns a character known as a question mark. Similarly, other rules may provide definitions for different characters based on various combinations of shape patterns. For example, Rule 9 provides that a combination of patterns PT3, PT3, PT1, and PT1 (illustrated in FIG. 4) returns a double exclamation mark (which may be a valid character of a particular language); Rule 9 provides that a combination of patterns PT2 and PT1 returns a question mark; and so on.

Based on the created combination rules, ontology classes may be created for particular patterns of character components. For example, in a domain of Japanese characters, the pattern PT2 may be associated with some PT2 or PT3 patterns shown in FIG. 4 based on characteristics related to alignment with bottom half of the previous character, to form a known Japanese character. In another example, the pattern PT2 may be associated with some PT1 patterns based on the bottom half alignment with the next character, and so on. In general, many combination rules defining a relationship between character components with known shape patterns that comprise a single known character may be developed. The created combination rules may be easy to use and/or add to. The combination rules may be created using, for example, one of a family of Web Ontology Languages® (OWL).

At block 212, the characters identified as described in reference to block 210 may be outputted, for example, in a code form, such as Unicode®. As shown in FIG. 5, each character in a particular language may correspond to a code form. For example, Rule 2 identifies a question mark with corresponding Unicode® equivalent uFF1F, Rule 4 identifies an exclamation point with corresponding Unicode® equivalent u0021, and so on. The outputted characters may be provided for display to a user.

Figure 6:
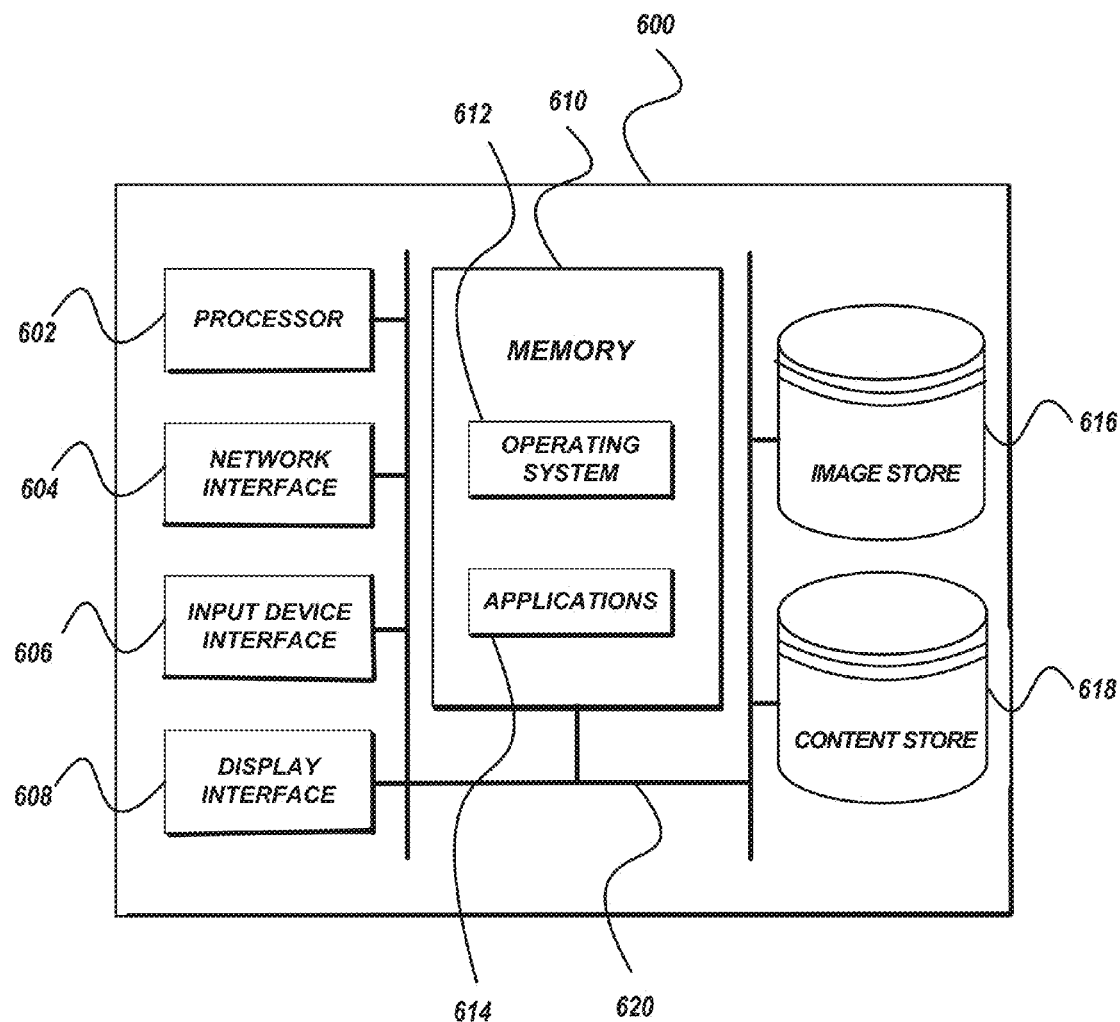
FIG. 6 illustrates an exemplary computing environment in which embodiments described in the present disclosure may be implemented in accordance with various embodiments.

FIG. 6 illustrates an example environment (e.g., one or more computing devices) suitable for implementing mediated embodiments of the arrangement described herein in accordance with various embodiments.

The computing devices may include, but are not limited to, laptop or tablet computers, personal computers, workstations, mini- and mainframe computers, and the like. The computing devices may also include specially configured computers for processing digital images. For example, the environment may include a computing device 102 configured to process digital images and described above in reference to FIG. 1. The general architecture of a suitable computing device is described below in regard to FIG. 6. More particularly, FIG. 6 is a block diagram illustrating exemplary components of a computing device 600 suitable for processing a digital image of content. However, the following description of the exemplary components of a computing device 600 should be viewed as illustrative only and not construed as limiting in any manner.

With regard to FIG. 6, the exemplary computing device 600 includes a processor 602 in communication with a variety of other components over a system bus 620. These other components may include, by way of example, a network interface 604, an input device interface 606, a display interface 608, and a memory 610. As appreciated by those skilled in the art, the network interface 604 enables the computing device 600 to communicate data, control signals, data requests, and other information with other resources including computers, data sources, storage devices, and the like, on a computer network such as the Internet (not shown). The network interface 604 may be configured to communicate via wired or wireless connections. As one skilled in the art will appreciate, the computing device 600 may obtain a digital image from another computer, a storage device, such as the content store 106, or other source via the computer network, as well as save the processed converted content to a networked location or send it to another computer on the network.

The input device interface 606, sometimes also embodied as an input/output interface, enables the computing device 600 to obtain data input from a variety of devices including, but not limited to, a digital pen, a touch screen, a keyboard, a mouse, a scanner, and the like. In addition to the exemplary components described above, a display interface 608 is used for outputting display information to a computer user. Typically, the display information is output by the display interface 608 via a display device (e.g., a CRT monitor, an LCD screen, a television, an integrated screen or sets of screens, etc.). Of course, while not shown, one skilled in the art will appreciate that a display device may be incorporated as an integral element within a computing device 600.

The processor 602 is configured to operate in accordance with programming instructions stored in a memory 610. The memory 610 generally comprises RAM, ROM, and/or other permanent memory. Thus, in addition to storage in read/write memory (RAM), programming instructions may also be embodied in read-only format, such as those found in ROM or other permanent memory. The memory 610 typically stores an operating system 612 for controlling the general operation of the computing device 600. The operating system may be a general purpose operating system such as a Microsoft Windows® operating system, a UNIX® operating system, a Linux® operating system, or an operating system specifically written for and tailored to the computing device 600. Similarly, the memory 610 also typically stores user-executable applications 614, or programs, for conducting various functions on the computing device 600. For example, the applications 614 in memory 610 may be configured according to components 104, 108, 110, and 114 described above in reference to FIG. 1.

The computing device 600 optionally includes an image store 616 and a content store 618. The image store 616 may store digital images for processing as described above in reference to FIGS. 1-5. As discussed above, a digital image may also be obtained from a scanner connected to the input device interface 606 or from an external source via the network interface 604. Once the digital image is processed, the converted digital content may be stored in the content store 618. Similarly, the document store may be viewed as optional as the resultant digital content may be immediately processed with their character content identified as earlier described.

A digital image processing system suitable for processing a digital image including character recognition using ontological rules (and optionally, neural networks) may be implemented in a single application or module (e.g., application 614) implemented on a computing device 600, or in a plurality of cooperating applications/modules (e.g., 104, 106, 108, 110, 112, 114, 116, and 118) on a single computing device, or in a plurality of cooperating applications and/or modules distributed in a computer network. However, irrespective of the actual implementation and/or topography of the digital image processing system, the digital image processing system may be identified with regard to various logical components.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A computer-implemented method for processing a digital image including recognizing characters with one or more components, comprising:
  obtaining, with a computing device, a digital image of content including multiple characters, wherein a first character of the multiple characters includes components;
  generating, with the computing device, a vectorized version of the digital image of the content, wherein the vectorized version of the digital image has one or more vector representations corresponding to the components;
  identifying, with the computing device, a first component of the components in the digital image, the identifying including evaluating the vectorized representations of the one or more components with a neural network having been trained to recognize components by matching the first component to one or more predefined component shape patterns, wherein a first component shape pattern of the one or more component shape patterns visually represents a component shape;
  determining, with the computing device, one or more characters from the first component, the determining including evaluating the identified components using a plurality of combination rules configured to detect relationships between the first component and a second identified component based at least in part on spatial positions of the first component relative to the second component, and to determine the characters from the detected relationships, the determining further including determining the characters based in part on positions of the characters on a page of text in the digital image of the content; and
  sending, with the computing device, character codes for the determined one or more characters, the character codes specified by the plurality of combination rules.

2. The computer-implemented method of claim 1, further comprising providing the plurality of combination rules by a combination rules engine.

3. The computer-implemented method of claim 1, wherein a combination rule of the plurality of combination rules includes a definition of a character based on a sequence including the first and second components and spatial positions of the first and second components relative to each other in the sequence.

4. The computer-implemented method of claim 1, wherein spatial position of the first component includes a boundary of an area in which the first component is located and a location of the first component within the boundary.

5. The computer-implemented method of claim 1, wherein the evaluating the vectorized representations of the one or more components with a neural network includes comparing, with the computing device, the vectorized representations of the one or more components to the one or more component shape patterns.

6. A computer-implemented method for processing a digital image, comprising:
 identifying, with a computing device, a first component of a plurality of characters included in a digital image of content, based at least in part on comparison of a vector representation of the first component with one or more predefined component shape patterns, wherein a first component shape pattern of the one or more predefined component shape patterns visually represents a component shape; and
 determining, with the computing device, a first character from the first component, the determining based at least in part on evaluating the first component using one or more predetermined combination rules that describe the first character based at least in part on relationships between the first component and a second component, including determining the first character based at least in part on a position of the first character on a page of text in the digital image of content.

7. The computer-implemented method of claim 6, further comprising:
 generating, with the computing device, a representation of the digital image of content, the representation including a vector representation of the first component of the plurality of characters, wherein the first character includes one or more components.

8. The computer-implemented method of claim 7, wherein the generating a representation of the digital image includes vectorizing the digital image to obtain a vectorized version of the digital image that includes the vector representation of the first component.

9. The computer-implemented method of claim 8, wherein the identifying the first component includes evaluating, with the computing device, the vectorized version of the digital image with a neural network having been trained to recognize components based on the one or more predefined component shape patterns.

10. The computer-implemented method of claim 9, wherein the vectorized version includes a spatial position associated with the first component, the spatial position including a boundary of an area in which the first component is located and a location of the first component within the boundary, and wherein the vectorized version further includes attributes derived from the spatial position.

11. The computer-implemented method of claim 10, wherein the relationships between the first component and the second component are based at least in part on spatial positions associated with the first component and the second component and the attributes derived from the spatial positions.

12. The computer-implemented method of claim 7, wherein the one or more predetermined combination rules are included in a combination rules engine.

13. The computer-implemented method of claim 6, further comprising outputting, with the computing device, character codes associated with the determined one or more characters.

14. The computer-implemented method of claim 6, further comprising obtaining, with the computing device, the digital image from scanning the content.

15. A computer system for processing digital images, the system comprising:
 at least one processor; and
 at least one memory having processor-executable instructions that, in response to execution by the at least one processor, cause the at least one processor to:
  identify a first component of a plurality of characters included in a digital image of content, based at least in part on comparison of a vector representation of the first component with one or more predefined component shape patterns, wherein a first component shape pattern of the one or more predefined component shape patterns visually represents a component shape; and
  determine a first character from the first component, the determining based at least in part on evaluating the first component using one or more predetermined combination rules that describe the first character based at least in part on relationships between the first component and a second component, wherein to determine includes to determine the first character based at least in part on a position of the first character on a page of text in the digital image of content.

16. The computer system of claim 15, wherein the processor-executable instructions further cause the at least one processor, in response to execution, to obtain the digital image from scanning the content.

17. The computer system of claim 15, wherein the one or more predetermined combination rules define the characters are based at least in part on spatial positions of the first and second components.

18. The computer system of claim 15, wherein the processor-executable instructions further cause the at least one processor, in response to execution, to output a determined character codes associated with the first character.

19. The computer system of claim 15, wherein the one or more predetermined combination rules further define the first character based at least in part on a shape of the first component and a position of the first component in a portion of a text.

20. A non-transitory computer-readable medium comprising computer-executable instructions for processing digital images, wherein the instructions, in response to execution by a computer, cause the computer to:
 identify a first component of a plurality of characters included in a digital image of content, based at least in part on comparison of a vector representation of the first component with one or more predefined component shape patterns, wherein a first component shape pattern of the one or more predefined component shape patterns visually represents a component shape; and
 determine a first character from the first component, the determining based at least in part on evaluating the first component using one or more predetermined combination rules that describe the first character based at least in part on relationships between the first component and a second component, wherein to determine includes to determine the first character based in part on a position of the characters on a page of text in the digital image of content.

21. The non-transitory computer-readable medium of claim 20, wherein the computer-executable instructions further cause the computer, in response to execution, to obtain the digital image from scanning the content.

22. The non-transitory computer-readable medium of claim 20, wherein the computer-executable instructions further cause the computer, in response to execution, to vectorize the digital image to generate the vector representation.

23. The non-transitory computer-readable medium of claim 20, wherein the vector representation includes a spatial position of the first components included in the digital image, wherein the first component is not disjointed.

24. The non-transitory computer-readable medium of claim 23, wherein the one or more predetermined combination rules are further based at least in part on the spatial positions of the first and second components and on attributes derived from the spatial positions.

25. The non-transitory computer-readable medium of claim 20, wherein the computer-executable instructions further cause the computer, in response to execution, to output a character code associated with the first characters.

* * * * *